United States Patent
Maier

[11] Patent Number: 5,844,769
[45] Date of Patent: Dec. 1, 1998

[54] EXHAUST PRESSURE TRANSDUCER

[75] Inventor: George E. Maier, Warrenville, Ill.

[73] Assignee: Navistar International Transportation Corp., Chicago, Ill.

[21] Appl. No.: 932,407

[22] Filed: Aug. 19, 1992

[51] Int. Cl.⁶ ................................. H01G 7/00
[52] U.S. Cl. .................... 361/283.4; 73/718; 73/724; 361/283.1
[58] Field of Search ............... 73/718, 724, 431, 73/756; 361/283, 283.1, 283.4; 29/25.41

[56] References Cited

U.S. PATENT DOCUMENTS

| | | | |
|---|---|---|---|
| 4,128,006 | 12/1978 | Grabow | 73/724 |
| 4,207,604 | 6/1980 | Bell | 361/283 |
| 4,414,851 | 11/1983 | Maglic | 73/706 |
| 4,425,799 | 1/1984 | Park | 73/718 |
| 4,426,673 | 1/1984 | Bell et al. | 361/283 |
| 4,490,773 | 12/1984 | Moffait | 361/283 |
| 4,774,626 | 9/1988 | Charboneau et al. | 361/283 |
| 5,060,108 | 10/1991 | Baker et al. | 361/283 |
| 5,079,921 | 1/1992 | McCandless et al. | 60/602 |
| 5,079,953 | 1/1992 | Martin et al. | 73/718 |
| 5,159,525 | 10/1992 | Tate | 361/283 |
| 5,186,054 | 2/1993 | Sekimura | 73/724 |

FOREIGN PATENT DOCUMENTS

| | | | |
|---|---|---|---|
| 1663462 | 7/1991 | U.S.S.R. | 73/718 |

*Primary Examiner*—Bot L. Ledynh
*Attorney, Agent, or Firm*—Dennis K. Sullivan

[57] ABSTRACT

An exhaust pressure capacitive transducer includes an improved pressure sensing cavity configuration. The cavity is either in the form of a wide cylinder or a cone so that the housing structure does not underlie the deflecting portion of the diaphragm but only the nondeflecting peripheral edge portion thereof to eliminating any ledges underlying the diaphragm which could collect soot thereon and prevent the diaphragm from returning to its undeflected position and giving an improper pressure reading.

4 Claims, 1 Drawing Sheet

EXHAUST PRESSURE TRANSDUCER

BACKGROUND OF THE INVENTION

The present invention pertains to an improved exhaust pressure transducer which is not fouled by exhaust gas residues, and provides exhaust pressure measurement over a significantly long period of time without failure.

THE PRIOR ART

U.S. Pat. Nos. 4,207,604 and 4,426,673 teach a pressure transducer having a housing within which a variable ceramic capacitor is mounted. One plate of the capacitor is fixed in position while the other plate is mounted to a deflectable diaphragm. Pressure applied to one side of the diaphragm is recorded as a particular value of microvolts from a source passed via the diaphragm mounted plate to the fixed plate. As the diaphragm mounted plate moves closer to the fixed plate, the capacitance changes and thus the voltage reading.

However, when this pressure transducer is used to measure exhaust gas pressure of a diesel engine, combustion residues can cause untrue readings of pressure. In this respect, hot exhaust gas cools down upon entering the transducer housing, with such quick cooling as to cause condensation of particulate matter in the exhaust gas into soot. The pressure sensing cavity in the transducer across which the diaphragm is mounted includes a ledge adjacent to the diaphragm. Soot collects along this ledge, maintaining the diaphragm deflected toward the fixed plate of the capacitor thereby resulting in an inaccurate reading.

Thus, creating a transducer within which soot cannot deposit against the diaphragm and would eliminate early transducer failure due to fouling by soot.

SUMMARY OF THE INVENTION

A primary object of the invention described and claimed herein is to provide an improved capacitive pressure transducer for use in measuring diesel engine exhaust gas pressure wherein the transducer can not be fouled by particulate matter in the exhaust gas.

A further object of the invention is to provide an exhaust gas pressure transducer having a sensing cavity which has no ledges therein upon which soot can collect to prevent movement of a diaphragm thereof.

These objects as well as others are met by providing a transducer having a conical or wide cylindrical pressure sensing cavity which has no ledges therein in an area underlying the transducer diaphragm upon which a plate of the transducer capacitor is mounted.

BRIEF DESCRIPTION OF THE DRAWINGS

Other objects and advantages of the invention will become more apparent upon perusal of the detailed description thereof and upon inspection of the drawings in which.

DESCRIPTION OF THE PREFERRED EMBODIMENTS

Figure 2:
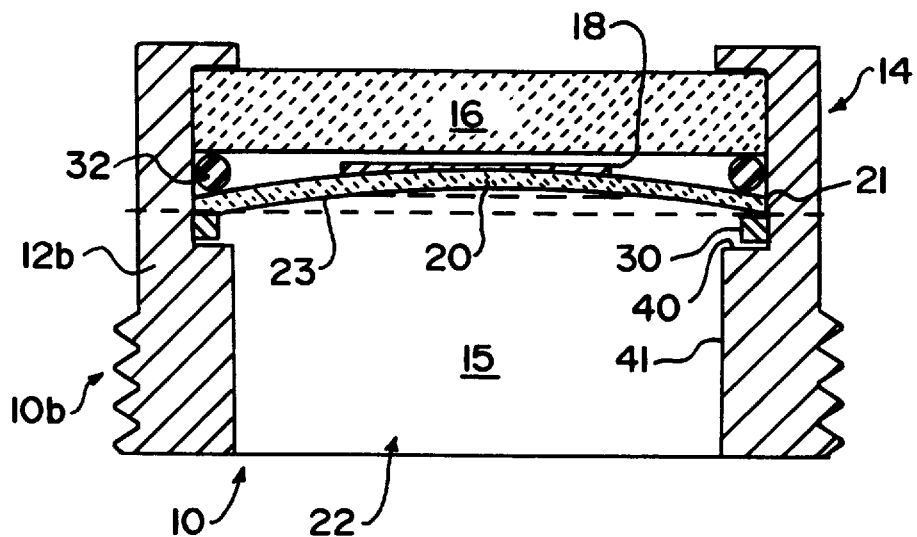
FIG. 2 is a cross section through a second embodiment of the improved exhaust pressure transducer of the present invention.
Figure 1:
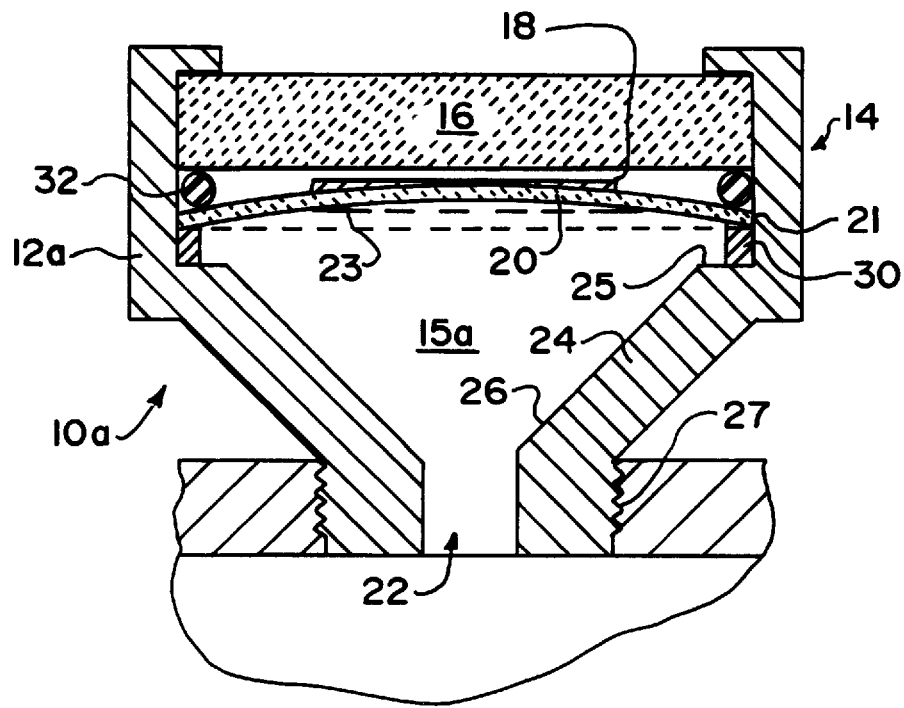
FIG. 1 is a cross section through one embodiment of the improved exhaust pressure transducer of the present invention.

Referring now to FIGS. 1 and 2 in greater detail, there is illustrated therein an exhaust pressure transducer 10 of the type described in the aforementioned U.S. Pat. Nos. 4,207,604 and 4,426,673, the teachings of which are incorporated herein by reference, which is used for measuring exhaust back pressure in a multicylinder, turbocharged diesel engine of the type described in U.S. Pat. No. 5,079,921.

Two embodiments, 10a and 10b, of the transducer of the invention are disclosed, both of which include a housing 12a, 12b within which a variable capacitor 14 is used for providing an indication of pressure sensed within a sensing cavity 15 of the transducer. The capacitor 14 comprises first and second plates 16 and 18, respectively. Plate 16 is fixed in position and plate 18 is mounted onto a diaphragm 20 disposed across one end of the pressure sensing cavity 15 within the transducer 10. The diaphragm 20 has a peripheral edge 21 which is mounted in fixed position in the housing 14, being sealed by O-ring 30 on the underside thereof to prevent exhaust gas from leaking into the chamber between the plates 16 and 18, and a large central portion 23 which deflects in response to pressure (the undeflected position being illustrated in phantom lines in the drawings) adjoining the peripheral edge on which the plate 18 is mounted. A further peripheral seal is provided between the diaphragm 20 and the fixed plate 16 by placement of fused glass frit between them as at 32.

Diesel exhaust gas may enter the transducer 10 through an inlet opening 22 in the housing 12 from the exhaust manifold (shown partially at 74) of a diesel engine (not shown) on which the transducer 10 may be mounted and causes deflection of the diaphragm 20 depending on the gas pressure. As the pressure increases, the deflection of the diaphragm 20 increases and the plate 18 comes closer to the fixed plate 16, thereby increasing the capacitance thereacross. This greater capacitance produces a higher output voltage reading, indicative of a higher pressure. Obviously, at lower pressures, the diaphragm 20 is deflected less, providing a lesser capacitance across the plate 18 mounted thereto, thus providing a lower output voltage reading indicative of a lower pressure within sensing cavity 15.

As stated above, when hot diesel exhaust gas enters the sensing cavity 15 of the transducer 10, the exhaust gas cools rapidly and particulate matter in the exhaust gas condenses into soot. Should the soot find footing on a surface adjacent the diaphragm 20 and increase in thickness over a long period of time, eventually the soot will interfere with the movement of the deflecting portion of the diaphragm 20 and prevent it from returning to its undeflected zero pressure position, thereby producing an erroneous output voltage at the lower end of the range of pressures measured. Such false readings cause significant problems in engine operation.

To eliminate such potential false readings, the transducer of the present invention is provided with a pressure sensing cavity 15 which has no soot supporting surfaces disposed sufficiently adjacent any part of the entire deflecting portion of the diaphragm 20 that soot buildup over time could prevent movement of the diaphragm.

In the embodiment 10a, the conical sensing cavity 15a is defined by a lower housing wall 24 having a small radial peripheral edge portion 25 underlying the diaphragm 20 adjacent the nondeflecting peripheral portion 21 thereof, to support the O-ring 30 seal in abutment against the periphery of the diaphragm 20, and an inverted conical wall portion 26 narrowing from the peripheral edge portion 25 to the exhaust gas opening 22. The exterior portion of the housing wall 24 is threaded at 27 to permit attachment of the transducer to the engine.

In the embodiment 10b, the pressure sensing cavity 15b underlying the deflecting central portion 23 of the diaphragm 20 is cylindrical, being defined by a cylindrical housing wall 41 having a radial edge 40 defined by a step in the housing wall 41 supporting O-ring 30 seal against the peripheral edge portion 21 of the diaphragm 20. The exteriorly threaded housing wall 41 provides an enlarged entrance to the sensing chamber 15b which may be easily accommodated with a larger opening in the engine mounting and which may be beneficial compared to the embodiment of FIG. 1 in preventing soot build-up in the entrance opening 22.

With such an open, non-ledged pressure sensing cavity 15, fouling of the transducer by deposition of soot therein cannot take place, thereby increasing the working life of the transducer. As described above, the transducer has a number of advantages, some of which have been described above and others of which are inherent in the invention. Also, modifications can be proposed to the transducer without departing from the teachings herein. Accordingly, the scope of the invention should only be limited as necessitated by the accompanying claims.

What is claimed is:

1. In combination with a diesel engine having an exhaust manifold, an exhaust gas pressure transducer including a housing mounted in said manifold defining an internal cavity having an exhaust gas inlet opening permitting the entry of exhaust gas having carbon particulates into said cavity, a pressure sensor disposed in said cavity, said pressure sensor comprising a planar flexible diaphragm having a peripheral portion disposed in fixed position in said housing and a large central deflecting portion adjoining said peripheral portion and disposed to deflect relative to said fixed peripheral portion upon the presence of pressure within said cavity, said cavity being characterized by the absence of housing structure disposed sufficiently adjacent to substantially the entire area of said deflecting portion of said diaphragm that, upon diesel engine exhaust gas being introduced in said cavity over a long time period, soot buildup on said housing structure would inhibit movement of said diaphragm wherein said cavity is defined by a cylindrical housing wall having a diameter equal to the diameter of the deflecting portion of said diaphragm.

2. The transducer of claim 1 wherein said cylindrical wall has a radial step therein which defines a ledge upon which an O-ring seal is seated against said fixed peripheral edge of said diaphragm.

3. In combination with a diesel engine having an exhaust manifold, a capacitive exhaust gas pressure transducer including a housing mounted in said manifold defining an internal cavity having an exhaust gas inlet opening permitting the entry of exhaust gas having carbon particulates into said cavity, a pressure sensor disposed in said cavity comprising a planar flexible diaphragm having a peripheral portion disposed in fixed position in said housing and a large central deflecting portion adjoining said peripheral portion and disposed to deflect relative to said fixed peripheral portion upon the presence of pressure within said cavity, a capacitor plate mounted on said diaphragm, and a fixed plate mounted in said housing cavity on the side of said diaphragm opposite said gas inlet opening, said housing cavity being characterized by the absence of housing structure disposed sufficiently adjacent to substantially the entire area of said deflecting portion of said diaphragm that, upon diesel engine exhaust gas being introduced in said cavity over a long time period, soot buildup on said housing structure would inhibit movement of said diaphragm wherein said cavity is defined by a cylindrical housing wall having a diameter equal to the diameter of the deflecting portion of said diaphragm.

4. The capacitive transducer of claim 3 wherein said cylindrical wall has a radial step therein which defines a ledge upon which an O-ring seal is seated against said fixed peripheral edge of said diaphragm.

\* \* \* \* \*